Dec. 14, 1948.　　　　V. FRAZIER　　　　2,455,989
TANDEM AXLE SPRING SUSPENSION
Filed Oct. 20, 1947　　　　　　　　　　5 Sheets-Sheet 1
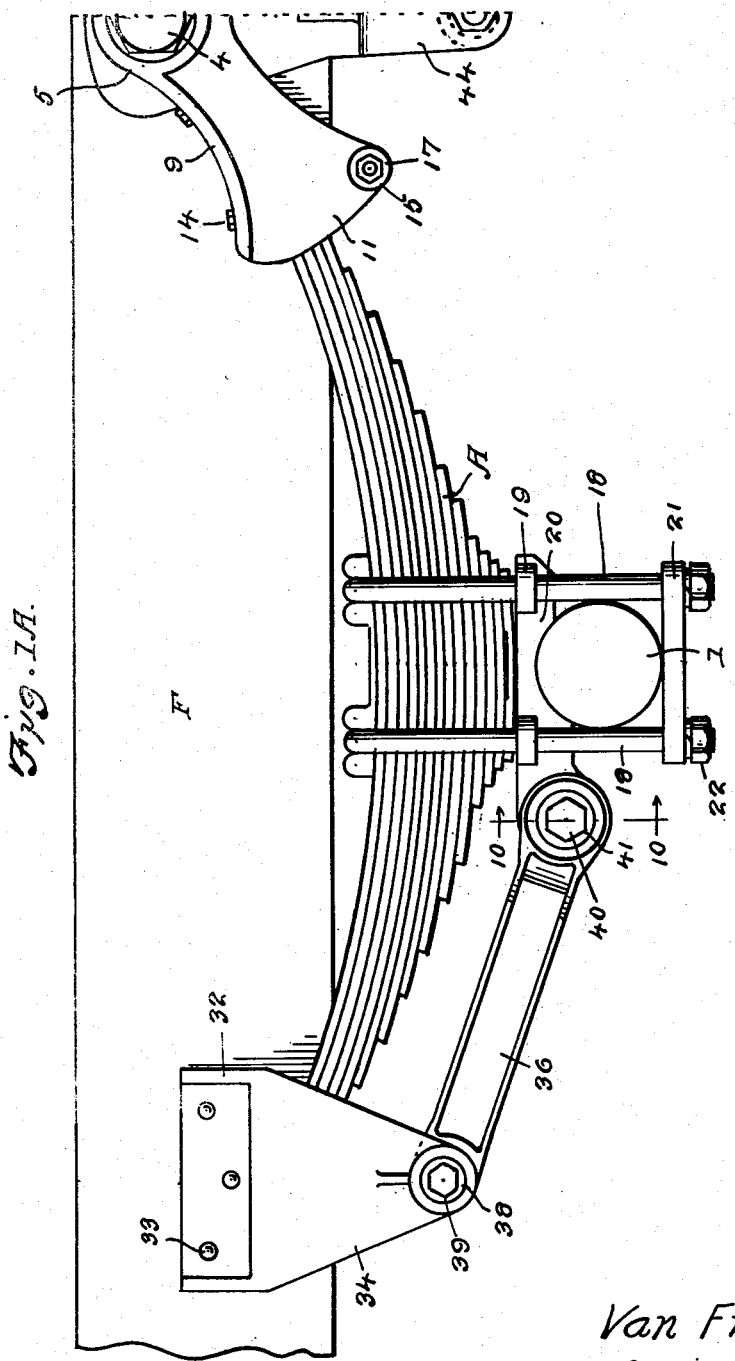
INVENTOR.
Van Frazier
BY Victor J. Evans & Co.
ATTORNEYS

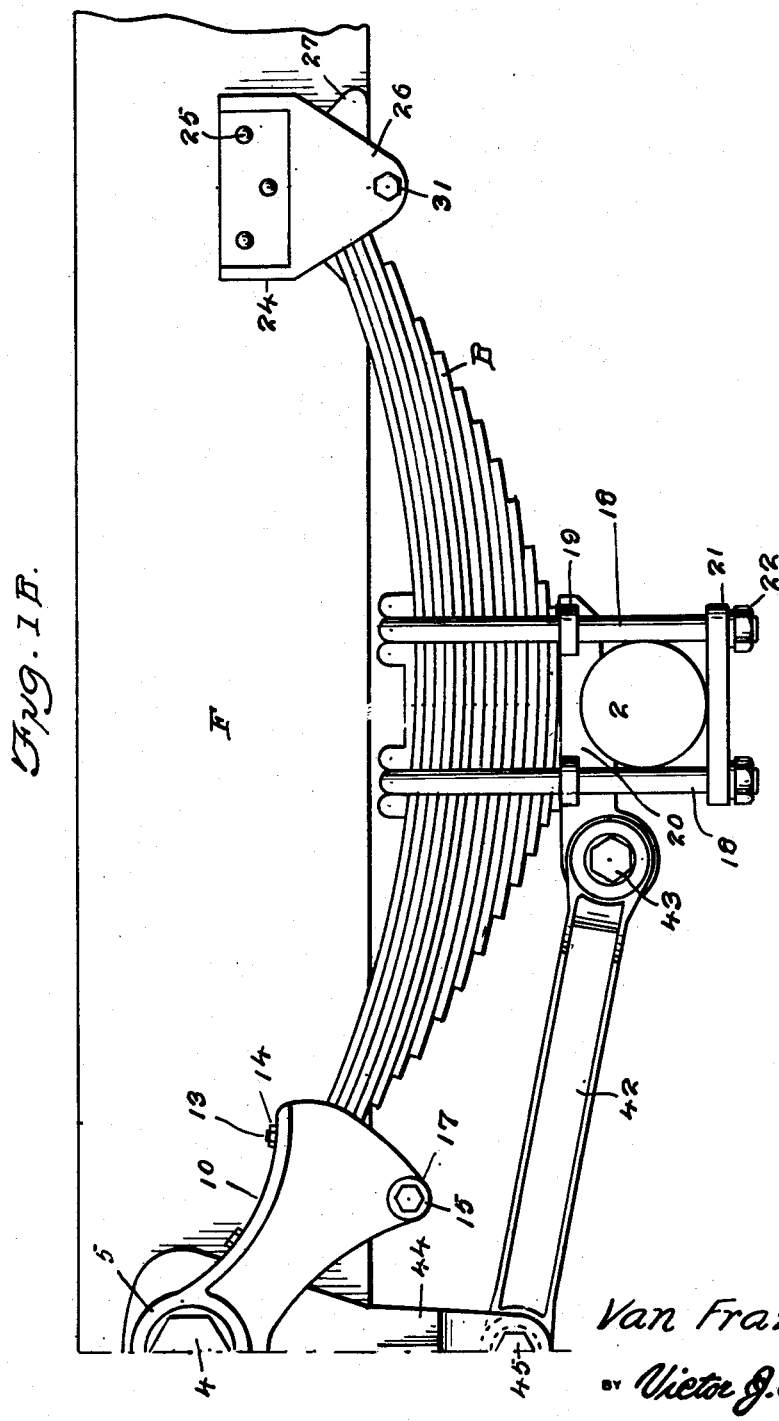

Dec. 14, 1948.    V. FRAZIER    2,455,989
TANDEM AXLE SPRING SUSPENSION
Filed Oct. 20, 1947    5 Sheets-Sheet 3
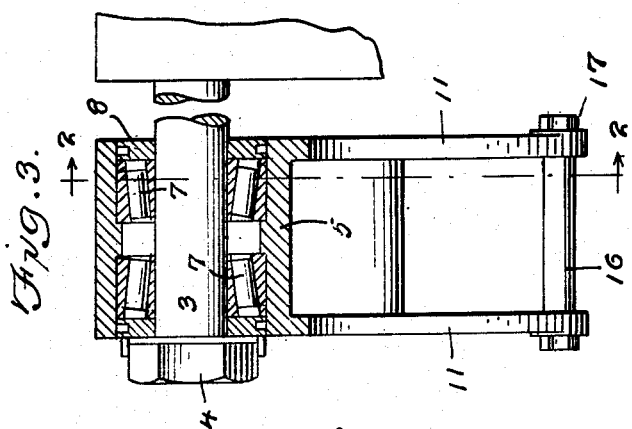
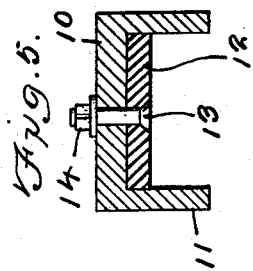
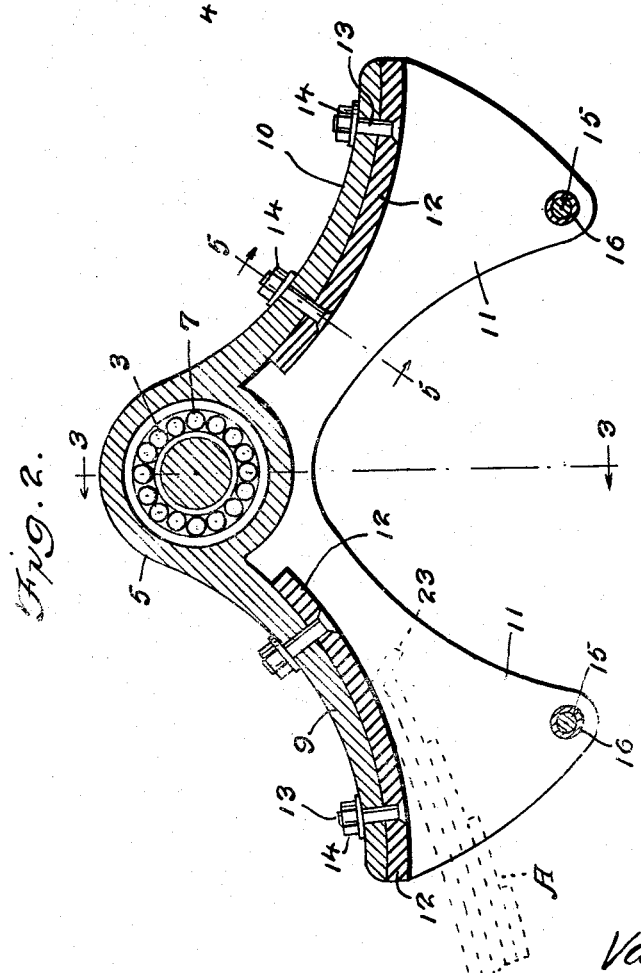
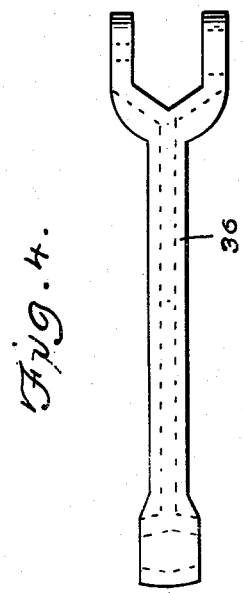
INVENTOR.
Van Frazier
BY Victor J. Evans & Co.
ATTORNEYS

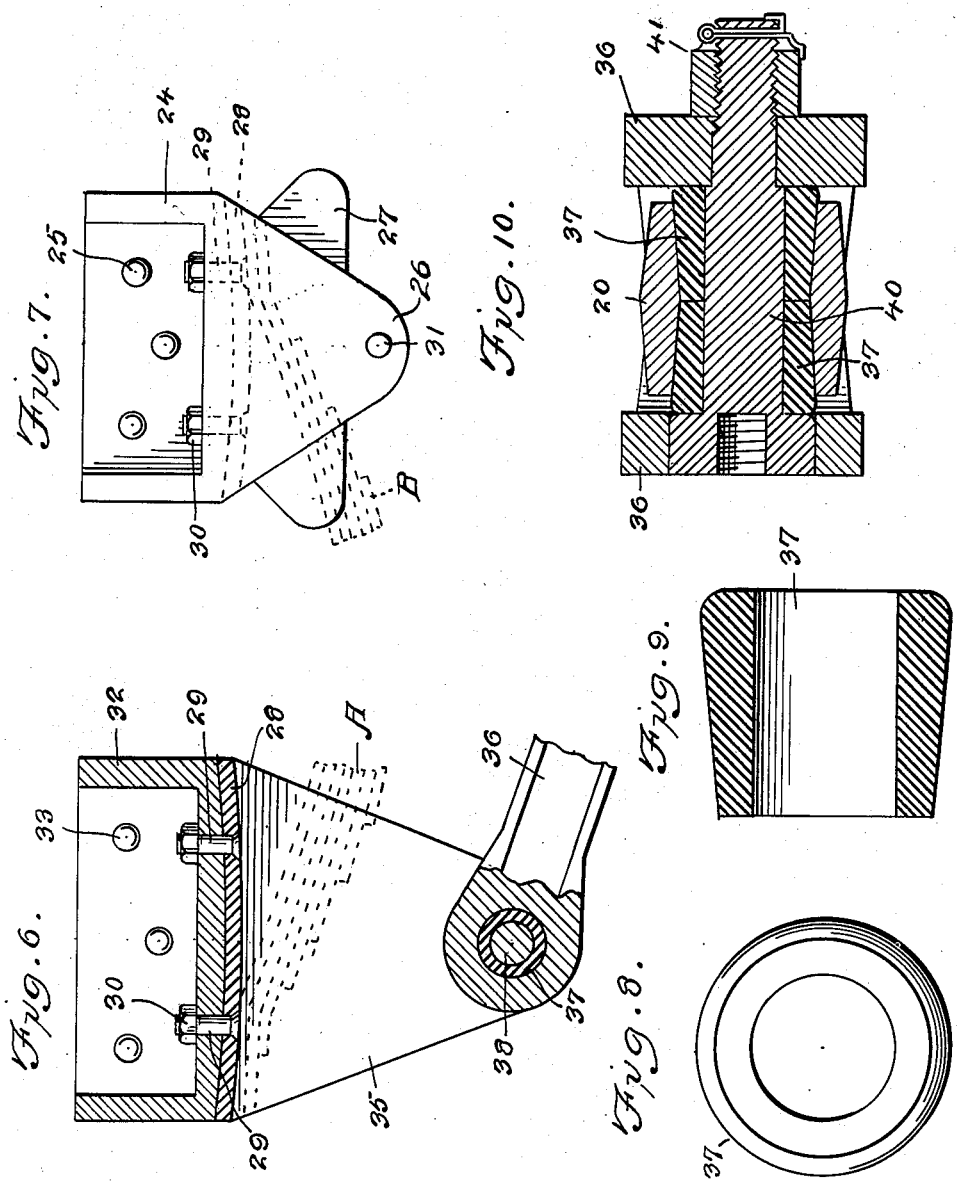

Dec. 14, 1948. V. FRAZIER 2,455,989
TANDEM AXLE SPRING SUSPENSION
Filed Oct. 20, 1947 5 Sheets-Sheet 5
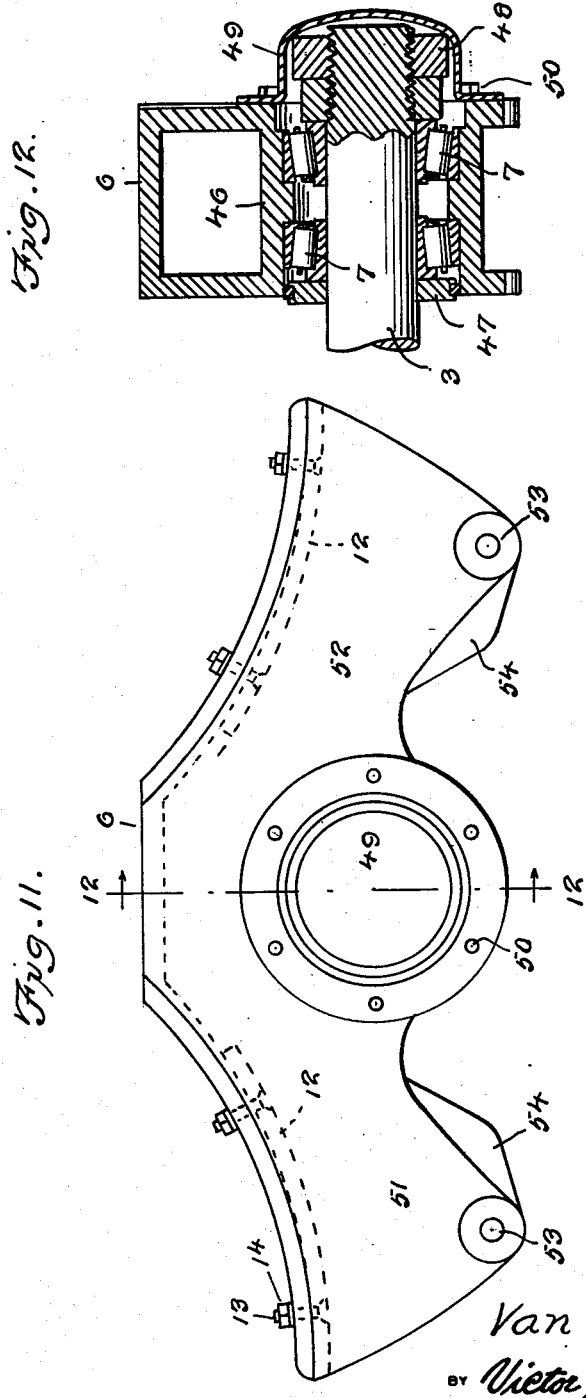
INVENTOR.
Van Frazier
BY *Victor J. Evans & Co.*
ATTORNEYS Patented Dec. 14, 1948

2,455,989

RE 23252

UNITED STATES PATENT OFFICE 2,455,989

TANDEM AXLE SPRING SUSPENSION

Van Frazier, Springfield, Mo.

REISSUED

Application October 20, 1947, Serial No. 780,876

AUG 1 1950

2 Claims. (Cl. 280—104.5)

My present invention relates generally to the spring suspension and running gear or under rigging of wheeled land vehicles, and more specifically to an improved tandem and axle system which, while adapted for use with various types of vehicles, is particularly designed for equalizing and distributing the load upon the two axles of a four-wheel vehicle of the trailer type, for instance a gasoline transport, and other similar payload haulers.

The primary object of the invention is the provision of an equalized leaf spring suspension of the tandem type in the running gear of vehicles which consists of a minimum number of standardized parts that may with facility be manufactured at low cost of production, and assembled with convenience for installation at the opposite sides of the vehicle, to insure a lightweight and compact axle system that is durable as to wear, and simple in operation.

A device which does not require the use of lubrication, prevents spring breakage and will wear for the life of the vehicle to which it is attached.

The parts of the running gear are automatically adjustable to compensate for variations in sizes of the pneumatic tires of the wheels of the vehicle, and adjustments and replacements for usual wear on co-operating parts may be made with ease for proper maintenance of the equipment.

The invention consists in certain novel features of construction and combinations and arrangements of parts as will be described hereinafter, and more specifically set forth in the appended claims.

In the accompanying drawings I have illustrated my invention as installed, in connection with the two transversely extending axles, at opposite sides of the vehicle; and the disclosed equipment is a complete embodiment in which the parts are combined and arranged in accord with one mode I have thus far devised for the practical application of the principles of my invention.

It will however be understood that changes and alterations are contemplated, and may be made, in these exemplifying drawings and mechanical structures, within the scope of my claims, without departing from the principles of the invention.

Figures 1A and 1B, jointly, show a view in side elevation of a tandem spring suspension and axle system for a vehicle of the four wheel type, in which the novel features and combinations and arrangements of my invention are physically embodied.

Figure 2 is a vertical longitudinal sectional view through the equalizer at line 2—2 of Fig. 3.

Figure 3 is a central transverse sectional view at line 3—3 of Fig. 2; and Figure 4 is a top plan view of the coupling link.

Figure 5 is a transverse sectional view at line 5—5 of Fig. 2; Figure 6 is a vertical sectional view through one of the suspending brackets; and Figure 7 is a side elevation of another spring-suspension bracket.

Figure 8 is a detail view of one of the tapered rubber wear-bushings; Figure 9 is a longitudinal sectional view of the bushing.

Figure 10 is a detail sectional view at line 10—10 of Fig. 1A.

Figure 11 is a view in side elevation of a modified form of the equalizer; and

Figure 12 is a vertical sectional view at line 12—12 of Fig. 11.

In order that the general arrangement and assembly of parts may readily be understood I have indicated in the drawings a frame member F that extends longitudinally of a trailer or other vehicle, together with the spaced pair of transverse axles 1 and 2 for the supporting wheels of the vehicle, and the tandem spring mechanism is mounted between these axles and supported by a central equalizer that is pivotally suspended upon one end of a horizontal suspension bar or shaft 3 that is mounted transversely of the vehicle in bearing bores of the frame F. The suspension bar extends from side to side of the frame, and its ends project an ample distance to form journals for the equalizers which are retained against displacement by retaining bolt heads 4, locking nuts, or similar devices.

As best seen in Fig. 2, the equalizer for the tandem springs A and B includes an apex, or central cylindrical bearing head 5 that is mounted on the outer end of the suspension bar 3 with two spaced tapered roller bearings 7, 7, that are retained in place by means of end plates or washers 8. A pair of integral downwardly and outwardly diverging channel shape arms 9 and 10, each having a pair of flanges 11, 11, which coact with the arms to define housings for coacting with a spring, and each arm is equipped with an inner lining or pad, as 12, of rubber or other suitable material to form a wear cushion or plate between the arms and the springs. These pads or wear cushions are fastened to the inner face of the channel-shaped arms by means of bolts 13 and exterior nuts 14, in order that wear may be taken up with facility by tightening the exterior nuts.

At the lower free ends of the arms each pair of flanges is united by a stop pin or bolt 15 upon which a tubular roller or pipe section 16 is mounted and secured by nut 17, to prevent excessive movement of the interconnected parts.

The two floating tandem springs A and B are each mounted upon an axle by pairs of U-bolts 18 that pass down through perforated ears or lugs 19 integral with an upper bearing plate 20, and through holes bored in the bottom plate 21 where the inverted bolts are secured by nuts 22; and the central portion of the spring, between the U-bolts may be drilled or bored to receive a retaining bolt that prevents relative slipping of the leaves of the springs.

The rear end of the spring A and the front end of the spring B are frictionally engaged within the equalizer arms, and the ends 23 of the top leaves of the springs which frictionally contact the cushions or pads 12, are turned down, as indicated, to form stop lugs.

The rear end of the spring B has a floating coaction within a bracket-housing or casing 24 that is riveted or bolted at 25 to the frame F, and the housing is fashioned with integral depending flanges 26 and 27 spaced apart to retain the spring against lateral displacement and to guide the movement of the spring relative to the bracket, or vice versa. The bracket-housing is provided with a wear pad or resilient cushion 28 which is secured on the flanges by bolts 29 and nuts 30, and a cross bolt 31 uniting the flanges 26 and 27 forms a stop for the spring.

The front end of the spring A is also supported in a bracket-housing or casing 32 which is attached to the frame F by bolts 33, and this bracket housing is fashioned with integral spaced flanges 34 and 35 to retain the ends of the spring against lateral displacement and guide its movement. This bracket also is provided with a replaceable wear pad or cushion 28 secured by bolts 29 and nuts 30, for co-action with the end of the floating spring.

Spring A is suspended from the bracket housing 32 by means of a coupling link 36 that forms a torque arm having a pivotal bearing at one end on a tapered bearing bushing 37, of rubber or other suitable wear material, which bushing surrounds a bearing bolt or pin 38, and the bushing is retained between the two flanges 34 and 35 together with the bearing end of the link by lock nut 39 on the bolt or pin 38.

The other end of the link or torque arm is forked and pivoted to the spring seat or plate 20 of the spring A by means of a pivot bolt 40 that passes through a bearing bore of the seat 20, and is locked by nut 41, and a pair of tapered bearing bushings 37 are employed for this link pivot.

The spring B is also provided with a coupling link or torque arm as 42 having at its forked end a pivotal bearing at 43 on the spring seat 20, which bearing is similar in construction and operation to the bearing between the link 36 and the seat for the spring A shown in Fig. 10. The front end of the torque arm 42 is suspended on a bracket 44 that is bored to slip over the end of suspension bar 3 and bolted or riveted to the frame F before the equalizer is mounted on the bar. The pivot bearing 45 between the link 42 and bracket 44 is the same as or similar to the front bearing of link 36.

Various alterations and changes may be made in adapting the invention and installing the tandem and axle system to different types of vehicles, as for instance in the manufacture of the castings forming the equalizers as indicated by the modifications in Figs. 11 and 12.

In these figures of the drawing one of a pair of flat-top equalizers indicated as a whole by the numeral 6 is illustrated as mounted upon the projecting end of the suspension bar 3, and the bearing head or integral cylindrical bushing 46 is dropped to a lower vertical plane than that shown in Fig. 2, and journaled on the two opposed and tapered roller bearings 7, 7. At the inner side of the equalizer a retaining plate 47 is mounted and provided with a felt washer to prevent escape or leak of grease for the bearings, and at the outer side of the equalizer lock nuts 48, 48 are threaded on the end of the suspension bar and equipped with a hub cap 49 that is secured by bolts or screws 50.

The hollow or channel shaped arms 51 and 52 are equipped with the wear plates 12, 12, and in addition to the holes 53 for the bolts or stop pins 15 and their rollers, the arms are fashioned with integral rocker stops 54, 54 to limit the relative movement between the adjoining ends of the springs and the arms of the equalizer.

From this description taken in connection with my drawings it will be apparent that each of the axles is anchored to the frame or chassis of the vehicle or trailer by a tongue arm that performs the functions of a coupling link, or draft link, and the three point suspension of the two floating tandem springs, together with the central equalizer, uniformly distribute the load and equalize the variations due to relative movements of parts of the equipment.

The floating movements of the two tandem springs is attained through the use of the two draft links, or coupling links which are pivotally mounted at their opposite ends to the brackets rigid with the chassis and the axle seats of the springs, which seats are rigid with the axle. The torque arms or coupling links maintain a constant space between the axles, and the links are so arranged that an equalized pull or draft on the axles, through the links eliminates possibility of vibration, as well as buckling of parts.

The co-acting parts of the equipment are provided with suitable resilient pads, cushions, or bushings, the former being readily replaceable, and the tapered bushings can be adjusted to compensate for wear by tightening the nuts and bolts, without necessity for removal or replacement; while the bearings of the torque arms are adjustable by means of the right hand and left hand screw bolts.

Having thus fully described my invention, what I claim as new and desire to secure by Letters Patent is:

1. In a tandem spring suspension for a vehicle, the combination with a longitudinally-extending frame, and a pair of spaced, parallel axles arranged transversely below said frame, of a shaft disposed above said axles and supported in said frame, an equalizer operatively connected to said shaft, said equalizer comprising a bearing head for rotatably receiving an end of said shaft, a pair of diverging channel arms dependingly carried by said bearing head, a pair of spaced, parallel flanges dependingly carried by each of said arms and coacting with the latter to define a pair of housings, an upper bearing plate supported on each of said axles, a pair of floating springs arranged in end-to-end relation with respect to each other and supported on said upper bearing plates, the adjacent ends of said springs being slidably seated in the housings of said equalizer, resilient means in each of said housings for engagement with the ends of said springs, a bracket casing arranged on each side of said equalizer and secured to said frame, a pair of spaced, parallel flanges dependingly carried by each of said bracket casings for receiving the other ends of said springs to prevent lateral displacement of the latter, resilient means in each of said bracket casings coacting with the complemental ends of said floating springs, a first coupling link having one end pivotally connected to one of said bracket casings and having its other end pivotally connected to one of said bearing plates, a bracket dependingly supported by said equalizer, a second coupling link having one end pivotally connected to said bracket and having its other end pivotally connected to the other of said bearing plates, and resilient means in the pivotal connections of said links.

2. In a tandem spring suspension for a vehicle, the combination with a longitudinally-extending frame, and a pair of spaced, parallel axles arranged transversely below said frame, of a shaft disposed above said axles and supported in said frame, an equalizer operatively connected to said shaft, said equalizer comprising a bearing head for rotatably receiving an end of said shaft, a pair of diverging channel arms dependingly carried by said bearing head, a pair of spaced, parallel flanges dependingly carried by each of said arms and coacting with the latter to define a pair of housings, an upper bearing plate supported on each of said axles, a pair of floating springs arranged in end-to-end relation with respect to each other and supported on said upper bearing plates, the adjacent ends of said springs being slidably seated in the housings of said equalizer, resilient means embodying a rubber pad secured to the under surface of each of said arms for engagement with the ends of said springs, a bracket casing arranged on each side of said equalizer and secured to said frame, a pair of spaced, parallel flanges dependingly carried by each of said bracket casings for receiving the other ends of said springs to prevent lateral displacement of the latter, resilient means in each of said bracket casings coacting with the complemental ends of said floating springs, a first coupling link having one end pivotally connected to one of said bracket casings and having its other end pivotally connected to one of said bearing plates, a bracket dependingly supported by said equalizer, a second coupling link having one end pivotally connected to said bracket and having its other end pivotally connected to the other of said bearing plates, and resilient means embodying tapered resilient bushings in the pivotal connections of said links.

VAN FRAZIER.

REFERENCES CITED

The following references are of record in the file of this patent:

UNITED STATES PATENTS

| Number | Name | Date |
| --- | --- | --- |
| 2,096,530 | Alden | Oct. 19, 1937 |
| 2,251,360 | Knox | Aug. 5, 1941 |
| 2,312,253 | Konetsky | Feb. 23, 1943 |
| 2,399,284 | Moore | Apr. 30, 1946 |
| 2,424,141 | Black | July 15, 1947 |